Sept. 17, 1968 T. LERNER 3,402,352

SYSTEM FOR TRANSMITTING THE DIFFERENCE BETWEEN AN INFORMATION SIGNAL AND A VARIABLE REFERENCE VOLTAGE

Filed Sept. 16, 1965 3 Sheets-Sheet 1

INVENTOR.
THEODORE LERNER
BY
Beau, Brooks, Buckley & Beau
ATTORNEYS

Sept. 17, 1968 T. LERNER 3,402,352
SYSTEM FOR TRANSMITTING THE DIFFERENCE BETWEEN AN INFORMATION SIGNAL AND A VARIABLE REFERENCE VOLTAGE
Filed Sept. 16, 1965 3 Sheets-Sheet 2

INVENTOR.
THEODORE LERNER
BY
Beau, Brooks, Buckley & Beau
ATTORNEYS

INVENTOR.
THEODORE LERNER
BY
Bean, Brooks, Buckley & Bean
ATTORNEYS

United States Patent Office 3,402,352
Patented Sept. 17, 1968

3,402,352

SYSTEM FOR TRANSMITTING THE DIFFERENCE BETWEEN AN INFORMATION SIGNAL AND A VARIABLE REFERENCE VOLTAGE

Theodore Lerner, Williamsville, N.Y., assignor to Bell Aerospace Corporation, Wheatfield, N.Y.
Filed Sept. 16, 1965, Ser. No. 487,855
3 Claims. (Cl. 325—38)

ABSTRACT OF THE DISCLOSURE

A signal $V_1$ characterized by periods of high information content and periods of low information content is simulated by an integrator having a positive and a negative input and an output $V_2$. The integrator inputs are controlled by a pair of Schmitt triggers to vary the output $V_2$ toward the signal $V_1$ when the difference between $V_1$ and $V_2$ exceeds a predetermined value. The outputs of the Schmitt triggers are used to transmit information only concerning the time duration of the periods of varying voltage of the output $V_2$ thus materially to reduce the duty cycle of the transmitter.

This invention relates to information transmission systems and, in particular, the invention relates to a pulse coded transmission system inherently permitting reduction of power required to communicate the information.

It is well known that signals such as the picture signal of a television system involve large variations in information rate. The fact that such signals are characterized by periods of high information content and periods of low information content has suggested various techniques for bandwidth compression and power reduction whereby such a signal is transmitted on a channel having insufficient information capacity to accommodate the periods of high information content. However, prior art efforts in this direction have, to my knowledge, been subject to certain disadvantages such as inherent spatial distortion of the reproduced picture, a staggering degree of complexity required to achieve significant bandwidth reduction and power reduction, or the requirement for plural channels for communicating the information, for example. It is, therefore, of primary concern in connection with this invention to provide a system as aforesaid in which reduction in the power required to communicate the information is achieved in a simple manner and without attendant or inherent disadvantages such as those set forth.

It is well known that television picture signals are characterized by a preponderant number of periods which are redundant or nearly so. According to the present invention, the many periods of redundancy or near-redundancy are simulated as periods of constant voltage amplitude joined by periods of increasing or decreasing voltage of predetermined slope and which latter periods are time-variable to establish the difference in voltage level between successive periods of simulated redundancy; and only information concerning the time duration of the periods of varying voltage is transmitted. In this fashion, the duty cycle of the transmitted signal may be materially reduced so that, in consequence, the average power requirement of the transmitter may also be reduced.

It is, accordingly, of primary concern in connection with this invention to provide a signal transmission system capable of transforming an input signal having periods of low information content and other periods of higher information content into a simulating signal having periods of constant voltage representative of the aforesaid periods of low information content and time-variable transition periods representative of the aforesaid periods of higher information content which join the periods of constant voltage; wherein the system transmits information only as to the nature of the transition periods.

More specifically, it is an object of this invention to provide an improved signal transmission system for communicating a signal characterized by periods of high information content and other periods of low information content in which the input signal and the voltage level of a variable reference voltage generating means are continuously compared for controlling pulse generating means responsive to a difference between the compared signals exceeding a predetermined amount for varying the output of the reference voltage generating means toward the input signal; the output of the pulse generating means only being transmitted.

Other objects and advantages of the invention will appear from the description hereinbelow and the accompanying drawing wherein:

FIG. 1 is a block diagram illustrating one form of the invention;

FIG. 1*a* is a diagram illustrating in dashed line the waveform of a typical portion of an input signal and in full line the waveform of the simulating signal;

FIG. 1*b* is a diagram illustrating the Schmitt trigger pulse output corresponding to the waveform of the simulating signal of FIG. 1*a*;

Figure 1:
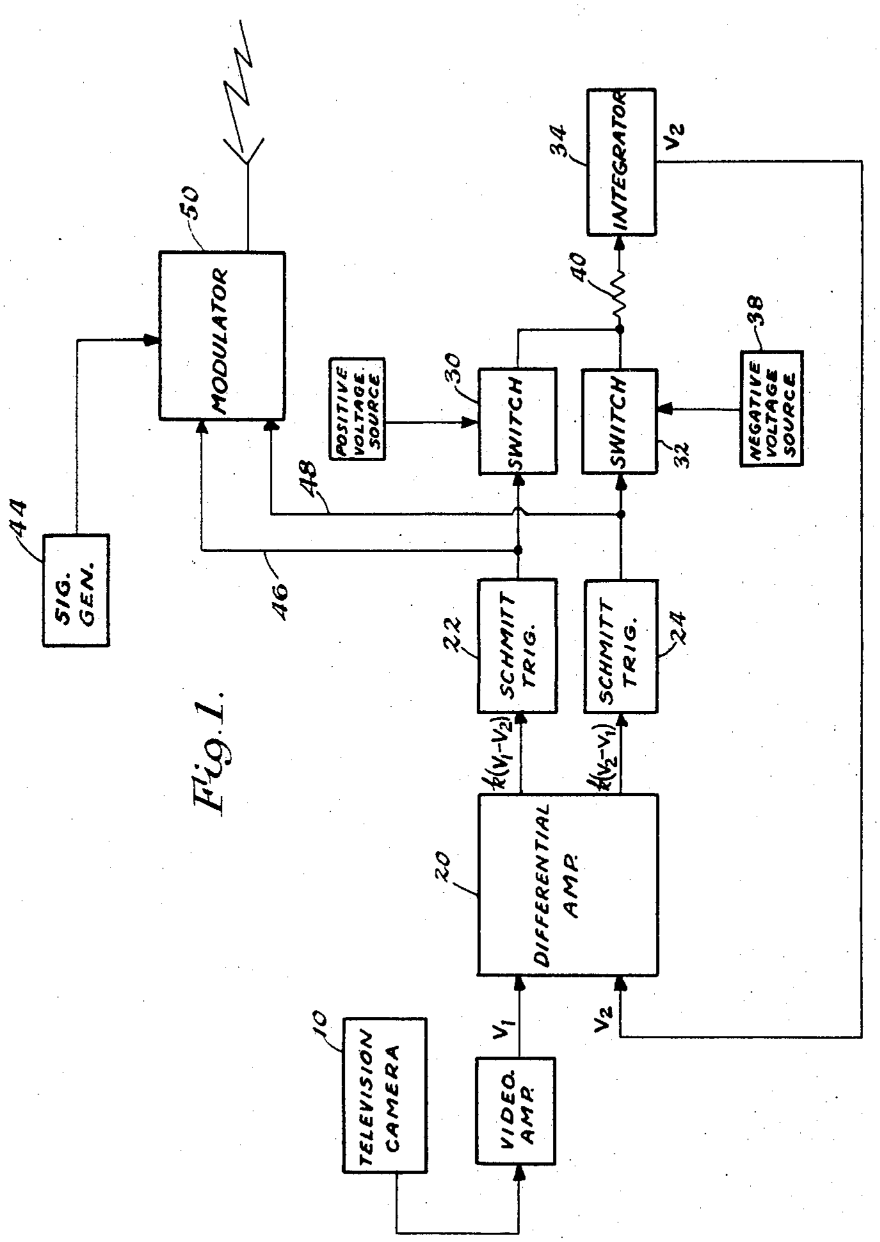
Figure 1B:
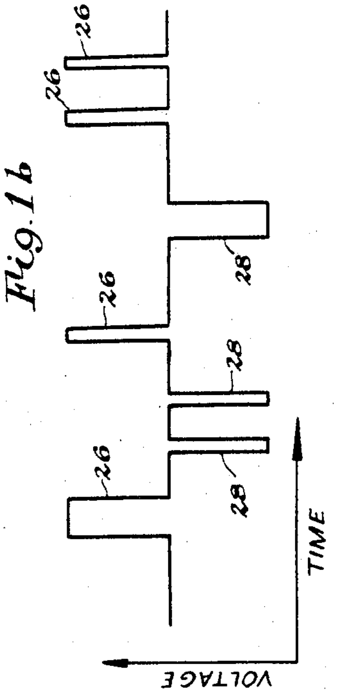
Figure 1A:
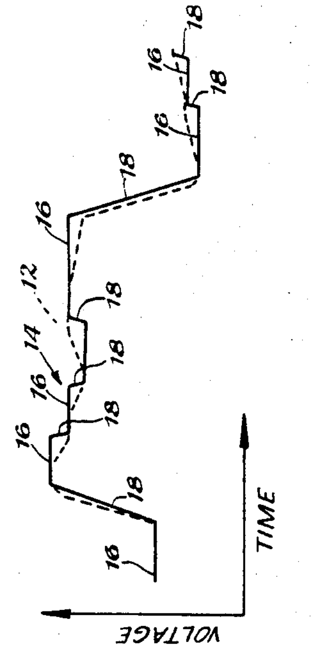
Figure 3:
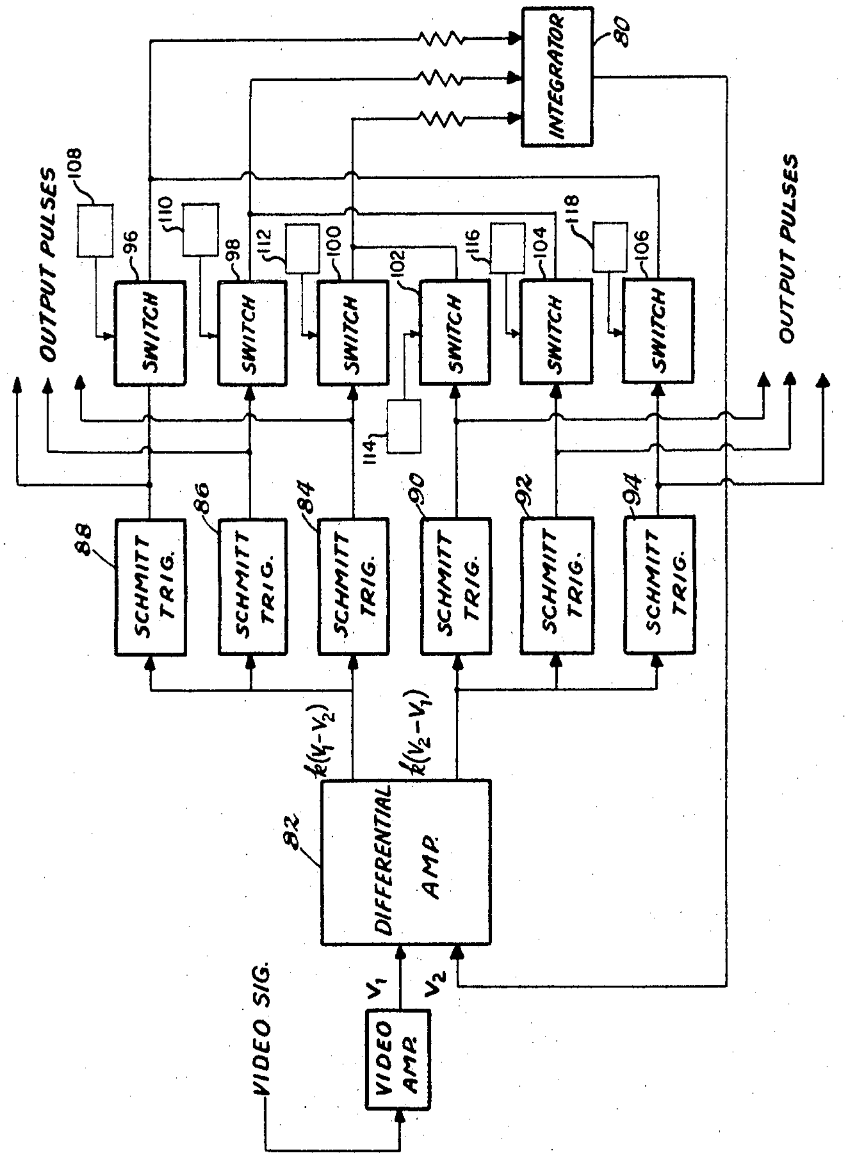
FIG. 3 is a block diagram illustrating a modified form of transmission system.

FIG. 3*a* is a diagram similar to FIG. 1*a* but illustrating waveforms of the system of FIG. 3; and FIG. 3*b* is a diagram similar to FIG. 1*b* but illustrating waveforms of the system of FIG. 3.

With reference now more particularly to FIG. 1, the system illustrated therein comprises means such as the television camera 10 for producing the input signal $V_1$ which is desired to be communicated. A representative portion of such input signal is shown in full line as at 12 in FIG. 1*a*, such representation serving to illustrate the usual case wherein the input signal is characterized by periods of higher information content and periods of low information content. During these latter periods the signal does not change appreciably. A simulating signal 14 shown in dotted line in FIG. 1*a* is produced to simulate the input signal 12 and, as shown, it will be apparent that the simulating signal $V_2$ (FIG. 1) is characterized by periods 16 of constant voltage level corresponding to periods of redundancy or near-redundancy of the input signal 12. Connecting these constant voltage periods of the simulating signal are periods 18 of varying voltage which are of fixed slope and are time variable to accommodate for the variation in voltage level between the various constant voltage level portions 16. These two signals $V_1$ and $V_2$ are applied as inputs to the difference amplifier 20 which has, as outputs, the voltages $k(V_1-V_2)$ and $k(V_2-V_1)$ proportional to the instantaneous difference between the two signals $V_1$ and $V_2$. These two outputs are applied to the respective Schmitt trigger circuits 22 and 24, each of which is adapted to fire and produce, respectively, positive and negative output pulses 26 and 28 (FIG. 1*b*) in response to some difference between the instantaneous values of the signals greater than a predetermined amount. Thus, one or the other of the triggers 22 or 24 will fire when a corresponding output, either $K(V_1-V_2)$ or $k(V_2-V_1)$ exceeds some value $v$. The respective output pulses of the triggers 22 and 24 close the normally open switch circuits 30 and 32 so that the integrator 34 may be altered in voltage level according to whether the relatively positive voltage source 36 or the relatively negative voltage source 38 is connected to the integrator 34. These respective voltage sources are adapted to charge or discharge the integrator 34 so long as an output pulse from the corresponding trigger circuit is present. Thus, the slope of the periods 18 (FIG. 1*a*) are dependent upon the time constant of the integrator 34 as it is charged or discharged through the resistor 40. It is seen that a closed loop exists, which forces the voltage $V_2$, to follow the input voltage $V_1$, the voltage $V_2$ being constrained to follow in steps, the magnitude of which are determined by the value of $v$.

The transmitter is represented in FIG. 1 by a signal generator 44 for producing a suitable carrier signal. The carrier signal is modulated only in response to the outputs of the trigger circuits 22 and 24, as shown by the connections 46 and 48 to the modulator 50. Thus, the duty cycle demand upon the transmitter is materially reduced. In the system shown in FIG. 1, suppressed carrier amplitude modulation may be preferred, and only the information regarding the pulse outputs of the Schmitt triggers is transmitted. With such modulation, positive pulses are used to generate RF pulses of one phase and negative pulses are used to generate RF pulses of the opposite phase, and in the absence of pulses, no RF carrier is transmitted. If the signal, as in the usual case for television signals, is highly redundant in the sense that the probability of changes from a previous value is low, then the duty cycle of the transmitted signal and the average power will be low. Thus, for television signals, the system provides reduction in average power required. This system does not lead to a reduction in required bandwidth. It is to be noted that bandwidth compression and transmitter power reduction do not necessarily go hand-in-hand. In fact, most bandwidth reduction techniques lead to a signal which is less immune to noise than the original signal and, consequently, a higher signal-to-noise ratio is required for proper interpretation of the signal. In most cases, the increased signal-to-noise ratio requirement more than offsets the reduced noise resulting from bandwidth reduction so that bandwidth reduction is obtained at the expense of increased transmitter power required.

Figure 2:
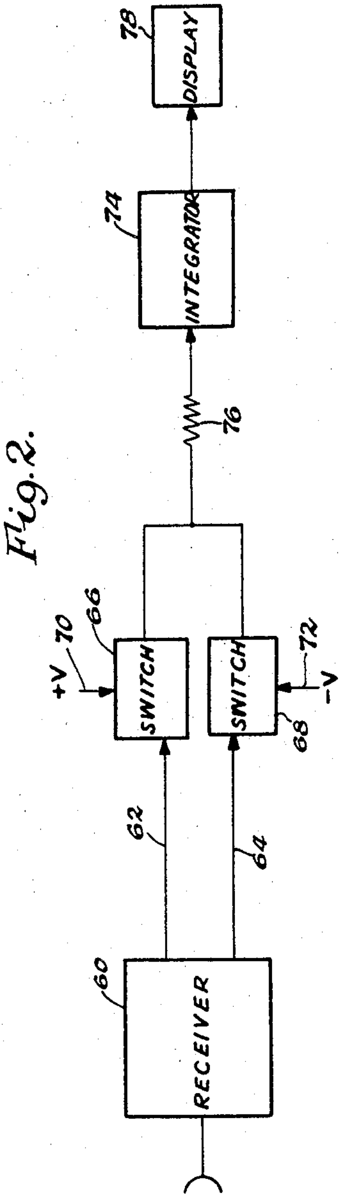
FIG. 2 is a block diagram of the receiving system employed with the transmitter of FIG. 1.

For reception of the signal transmitted by the system of FIG. 1, it is necessary merely to duplicate the simulated signal $V_2$. As shown in FIG. 2, this may be accomplished by demodulating the signal in the receiver 60 and applying the positive or negative pulses, as through the respective conductors 62 and 64, to the switches 66 and 68. Whenever a pulse appears, the appropriate switch is closed to connect either the positive or the negative voltage source, 70 and 72 respectively, to the integrator 74 through resistor 76. The signal simulated by the integrator 34 in FIG. 1 is thus duplicated in the receiving integrator 74 for ultimate display on a suitable mechanism 78.

In a system as described heretofore, a limitation exists in the ability of the simulating signal to follow the input signal during periods of very fast changes in input voltage, due to the limited charge rate of the integrator. If the charge rate is increased in order to permit more accurate following during periods of very fast change of the input signal, then, because of the limited response capability of the electronic circuitry, the size of the steps in the simulating signal will have to be increased to prevent oscillation of the closed loop system. Therefore, where high fidelity reproduction of the input signal is required, a modified system is proposed in which the charge rate of the integrator is high during periods of fast change of the input signal, and slow during periods of slow change of the input signal.

With reference now to FIG. 3, the modified system is obtained by ultilizing a plurality of pairs of Schmitt trigger circuits instead of a single pair as in FIG. 1. As in FIG. 1, the output $V_2$ of the variable reference voltage generator or integrator 80 is applied, together with the video input signal $V_1$, to the differential amplifier 82. The output of the differential amplifier is, as before, $k(V_1-V_2)$ or $k(V_2-V_1)$ depending upon which signal $V_1$ or $V_2$ is greater. The output signal $k(V_1-V_2)$ is applied simultaneously to the three triggers 84, 86 and 88 whereas the output signal $k(V_2-V_1)$ is applied simultaneously to the three triggers 90, 92 and 94; of which triggers, the triggers 84 and 90 may be considered one pair, the triggers 86 and 92 a second pair, and the triggers 88 and 94 a third pair. These pairs of triggers are constructed so that the appropriate trigger of the first pair fires when the signal $k(V_1-V_2)$ or $k(V_2-V_1)$ reaches a value $V_1$; the appropriate trigger of the second pair fires when the corresponding signal reaches a value $V_2$; and the appropriate trigger of the third pair fires when the corresponding signal reaches a value $V_3$. These triggers control switches 96, 98, 100, 102, 104 and 106 which control currents of different magnitudes available from the associated current sources 108, 110, 112, 114, 116 and 118, when the appropriate trigger of the first pair fires, a relatively small current is connected to the integrator, producing a relatively slow charge rate out of the integrator. When the appropriate trigger of the second pair fires, a larger current is connected to the integrator, producing a faster charge rate out of the integrator. When the appropriate trigger of the third pair fires, an even higher current is connected to the integrator, producing a very fast charge rate out of the integrator.

The output pulses from the Schmitt triggers are used to modulate a transmitter. The pulses from different Schmitt triggers may be used to produce transmitted pulses of different frequency, or alternately to produce pulses of different phase in a suppressed carrier six phase system.

It is to be understood that certain changes and modifications as illustrated and described may be made without departing from the spirit of the invention or the scope of the following claims.

I claim:

1. In a transmission system for communicating a signal characterized by periods of high information content and periods of low information content, by means of a low duty cycle transmission, in combination:
- variable reference voltage generating means comprising an integrator,
- means for determining the difference between the input signal and the reference voltage,
- pulse generating means responsive to an output of the last means which exceeds a predetermined amount for varying the output of said reference voltage generating means toward said input signal, said pulse generating means including at least a pair of Schmitt triggers for respectively raising and lowering the votlage level of said integrator,
- and a modulator connected to said pulse generating means for transmitting the output pulse information thereof.

2. In a signal transmission system for communicating a signal characterized by periods of high information content and periods of low information content, by means of a low duty cycle transmission, in combination:
- input signal generating means having a variable voltage output $V_1$,
- an integrator having a charging rate commensurate with the information rate of said periods of high information content and having a variable voltage output $V_2$,
- a pair of triggers responsive to voltage input thereto exceeding a predetermined value V for respectively increasing and decreasing the voltage output $V_2$ of said integrator,
- means for determining the difference in voltage level between said voltage output $V_1$ of the input signal and said voltage output $V_2$ of the integrator and having outputs proportional to $V_1-V_2$ and $V_2-V_1$, said outputs proportional to $V_1-V_2$ and $V_2-V_1$, being connected to respective ones of said triggers,
- and transmitting means connected to the outputs of said triggers for signal modulation thereby.

3. In a signal transmission system, in combination:
input signal generating means having a voltage output $V_1$ characterized by periods of high information content,
transmitting means having a limited duty cycle or limited average power capability,
variable reference voltage generating means having an output $V_2$,
voltage difference means for determining the instantaneous difference between the aforesaid voltage $V_1$ and $V_2$ and having outputs proportional to $V_1 - V_2$ and $V_2 - V_1$.
pulse generator means for modulating the output channel of said transmitting means within the information capacity thereof, said pulse generating means being connected to the outputs of said voltage difference means for producing time variable positive and negative output pulses respectively in response to the outputs of the voltage difference means exceeding a predetermined value V,
and means connected to the outputs of said pulse generating means for varying the instantaneous output $V_2$ of said reference voltage generating means towards the instantaneous output $V_1$ of said input signal generating means.

References Cited

UNITED STATES PATENTS

| | | | |
|---|---|---|---|
| 2,916,553 | 12/1959 | Crowley | 325—38.1 |
| 3,273,141 | 9/1966 | Hackett | 325—38.1 |

ROBERT L. GRIFFIN, *Primary Examiner.*

J. T. STRATMAN, *Assistant Examiner.*